United States Patent [19]
Bitner

[11] Patent Number: 6,146,433
[45] Date of Patent: Nov. 14, 2000

[54] INTERNAL AIR BAFFLE

[75] Inventor: Glenn W. Bitner, Alsip, Ill.

[73] Assignee: Venturedyne, Ltd., Milwaukee, Wis.

[21] Appl. No.: 09/309,700

[22] Filed: May 11, 1999

[51] Int. Cl.$^7$ .................................................. B01D 46/00
[52] U.S. Cl. ............................... 55/321; 55/324; 55/331; 55/418
[58] Field of Search ................................ 95/268; 55/321, 55/323, 324, 325, 331, 418, 341.1, 341.7

[56] References Cited

U.S. PATENT DOCUMENTS

| | | | |
|---|---|---|---|
| 1,601,148 | 9/1926 | Ruemelin | 55/324 |
| 1,743,934 | 1/1930 | Ruemelin . | |
| 2,072,906 | 3/1937 | Rosenberger | 55/341.7 |
| 2,507,335 | 5/1950 | Donohue | 55/341.7 |
| 3,201,924 | 8/1965 | Fulford et al. | 55/324 |
| 3,726,066 | 4/1973 | Colley et al. | 55/341.1 |
| 3,926,595 | 12/1975 | Bockman . | |
| 3,992,177 | 11/1976 | Welteroth . | |
| 4,227,903 | 10/1980 | Gustavsson et al. . | |
| 4,264,345 | 4/1981 | Miller | 55/341.1 |
| 4,655,804 | 4/1987 | Kercheval et al. . | |
| 4,718,924 | 1/1988 | DeMarco . | |
| 4,778,491 | 10/1988 | Yow, Sr. . | |
| 4,799,943 | 1/1989 | Giusti et al. | 55/418 |
| 4,919,801 | 4/1990 | Hobson, Jr. | 55/418 |
| 5,120,333 | 6/1992 | Davis . | |
| 5,174,797 | 12/1992 | Yow, Sr. et al. . | |
| 5,176,726 | 1/1993 | Beavis | 55/341.1 |
| 5,279,629 | 1/1994 | Stueble . | |
| 5,709,721 | 1/1998 | Stueble . | |
| 5,803,954 | 9/1998 | Gunter et al. | 55/324 |
| 5,846,300 | 12/1998 | Johnson | 55/418 |

*Primary Examiner*—Duane S. Smith
*Attorney, Agent, or Firm*—Jansson, Shupe, Bridge & Munger, Ltd.

[57] ABSTRACT

An air-channeling apparatus for channeling the flow of air into a dirty-air chamber of a dust collector. The air-channeling apparatus having a top baffle member secured with respect to the ceiling of the dust collector, the top baffle member positioned at the entrance port to the dirty-air chamber and inwardly converging toward the ceiling to define a first opening therebetween. A first angled baffle member is connected to and angled away from the top baffle member while a rear baffle member having a plurality of openings is attached to the ceiling of the dirty-air chamber inward of the first opening. Furthermore, a vertical baffle member is positioned in registry with a portion of the air entrance port and spaced from the ceiling. The vertical baffle member is secured with respect to the ceiling so as to define a second opening with respect to the side wall having the air entrance port. Finally, a second angled baffle member is spaced from and secured with respect to the ceiling. This second angled baffle member is spaced immediately inboard of the vertical baffle member between the vertical baffle member and the first angled member thereby defining a third opening between the vertical baffle member and the second angled member and a fourth opening with respect to the first angled baffle member.

11 Claims, 4 Drawing Sheets

INTERNAL AIR BAFFLE

FIELD OF THE INVENTION

This invention relates generally to an air channeling device, and in particular to a baffle for channeling air into the dirty-air chamber of an industrial dust collector.

BACKGROUND OF THE INVENTION

Dust collectors or dust collection systems are well known in the art. These systems are used to filter particles out of air that is drawn from various sources including fume and ventilation hoods used in industrial applications such as welding and chemical and pharmaceutical processing.

Currently the stream of dirty air generated by the fume and ventilation hoods is drawn directly into a dirty-air chamber contained within the dust collector. Once inside, the dirty air drifts down over the rows of filter cartridges aligned within the chamber.

In most operations, a conventional fan is used to create the pressure drop that allows the dirty air to be drawn into the chamber. Because of this, the direction of the flow of air once inside is primarily dependent upon the amount of pressure differentiation created by the fan and includes the directed air flow through the entrance port and the location of filters inside the chamber. This can cause the air to be unevenly distributed across the filter cartridges resulting in an inefficient use of the filters. Therefore, an apparatus that would allow for balanced air flow across all of the rows of filters within the dirty-air chamber would be an important improvement in the art as it would allow the dirty-air to be distributed more evenly across the length of the filter cartridges thus resulting in a more efficient filtering of the air.

OBJECTS OF THE INVENTION

An object of the invention is to provide a new air channeling apparatus for channeling the flow or air into the dirty-air chamber of a dust collector that overcomes some of the problems and shortcomings of the prior art.

Another object of the invention is to provide a new air channeling apparatus for channeling the flow of air into the dirty-air chamber of a dust collector that balances the flow of air over the length of the filter cartridges.

Still another object of the invention is to provide a new air channeling apparatus for channeling the flow of air into the dirty-air chamber of a dust collector that directs the flow of dirty air across and around the filter cartridges located in a dust collector in such a manner so as to increase the efficiency of the filters. How these and other objects are accomplished will become apparent from the following descriptions and from the drawings.

SUMMARY OF THE INVENTION

This invention involves an air-channeling apparatus that is designed to channel the flow of air into the dirty-air chamber of a dust collector having an air entrance port, a ceiling, a bottom portion, and side walls including one with the air entrance port. The air-channeling apparatus is comprised of a top baffle member that is secured with respect to the ceiling. The top baffle member is positioned at the entrance port and converges inwardly toward the ceiling in order to define a first opening therebetween. A first angled baffle member connects to and angles away from the top baffle member.

In another embodiment of the invention, a rear baffle member having a plurality of openings is attached to the ceiling inward of the first opening. In still another embodiment, a vertical baffle member in registry with a portion of the air entrance port and spaced from the ceiling is also secured with respect to the ceiling thereby defining a second opening with respect to the side wall having the air entrance port.

In a preferred embodiment of the invention, a second angled baffle member is also spaced from and secured with respect to the ceiling. This second angled baffle member is spaced immediately inboard of the vertical baffle member thereby defining a third opening between the vertical baffle member and the second angled member and a fourth opening with respect to the first angled baffle member. In a specific version of the preferred embodiment, the rear baffle member is curved. In a more specific version, the rear baffle member is curved approximately 150° from the air entrance port.

In yet another version of the preferred embodiment, the vertical baffle member extends in a direction substantially parallel to a first plane which is defined by the air entrance port and is substantially perpendicular to the flow of air. The second angled baffle member has a first edge that extends along a second plane which is parallel to the first plane. In this embodiment, the vertical baffle member is connected to the second angled baffle member by a plurality of first separators which are positioned along the length of the vertical baffle member, and the second angled baffle member is connected to the first angled baffle member by a plurality of second separators that are positioned along the length of the second angled baffle member thereby forming various channels to accommodate the flow of air.

In the most preferred embodiment, the air-channeling apparatus is comprised of a top baffle member that is secured with respect to the ceiling of the air chamber. Such top baffle member is positioned at the entrance port of the chamber and converges inwardly toward the ceiling where it defines a first opening between itself and the ceiling. A first angled baffle member is connected to and angled away from the top baffle member. Also in this embodiment, a rear baffle member having a plurality of holes is attached to the ceiling inward of the first opening while a vertical baffle member, in registry with a portion of the air entrance port, is spaced from and secured with respect to the ceiling. This vertical baffle member defines a second opening with respect to the side wall having the air entrance port. Finally, a second angled baffle member is located immediately inboard of the vertical baffle member thereby defining a third opening between the vertical baffle member and the second angled member and a fourth opening with respect to the first angled member.

In a particular version of the most preferred embodiment, the rear baffle member is curved. In a more specific version of such embodiment, the rear baffle member is curved approximately 150° from the air entrance port.

In yet another version of the preferred embodiment, the vertical baffle member extends in a direction substantially parallel to a first plane that is defined by the air entrance port and is substantially perpendicular to the flow of incoming air. The second angled baffle member includes a first edge which extends along a second plane that is parallel to the first plane. A plurality of first separators are positioned along the length of the vertical baffle member so as to connect the vertical baffle member to the second angled baffle member and a plurality of second separators positioned along the length of the second angled baffle member connect the second angled baffle member to the first angled baffle member thereby forming various channels to accommodate the flow of air.

DETAILED DESCRIPTIONS OF PREFERRED EMBODIMENTS

Figure 1:
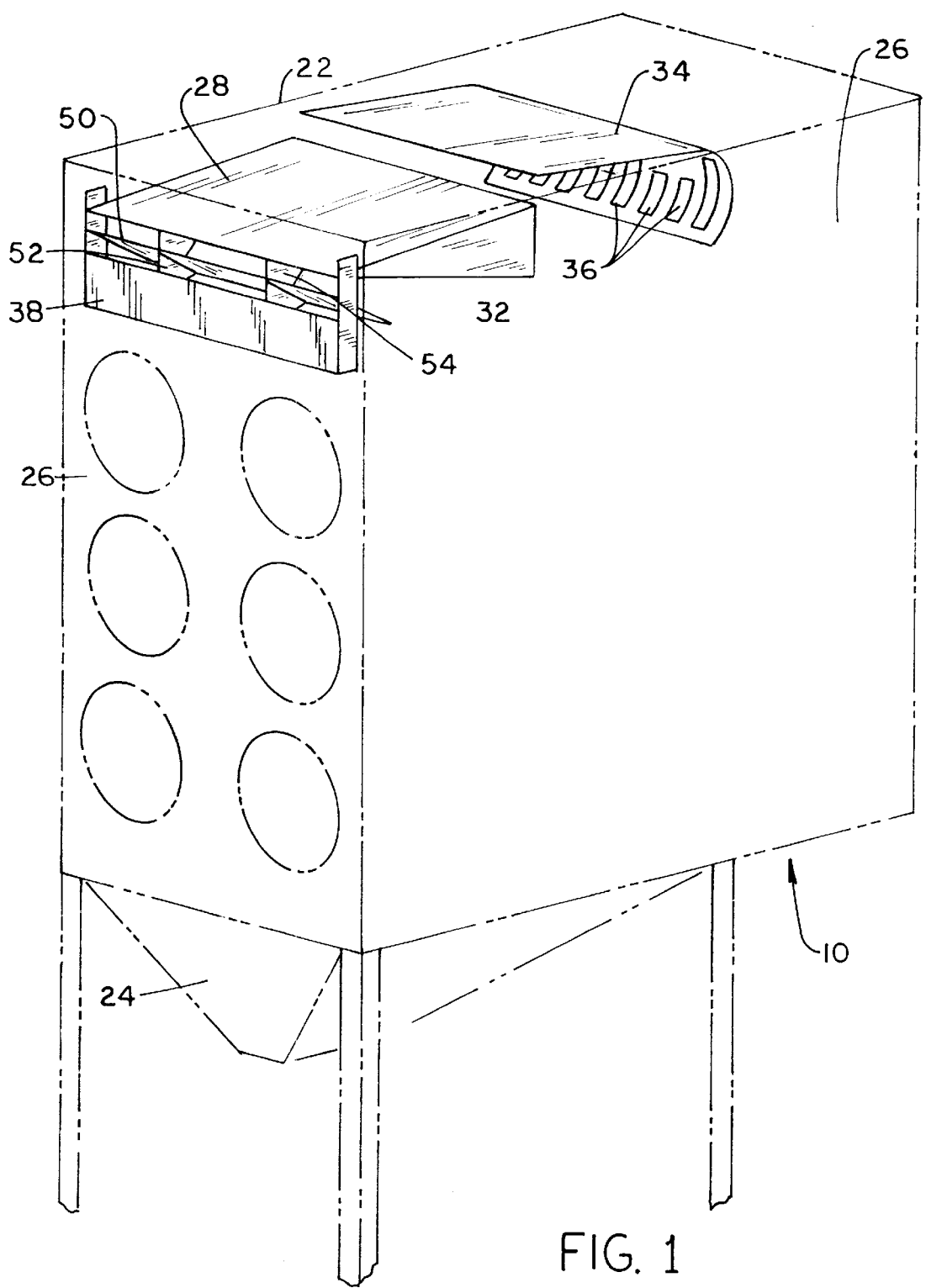
FIG. 1 is a is a perspective view showing the air-channeling apparatus positioned within the outline of a dust collector.

Before describing the invention it will be helpful to first explain the type of dust collector 10 in which the invention is utilized. Dust collectors 10 or dust collection systems are utilized to remove impurities from the air. Such air is drawn from various sources including fume and ventilation hoods used in industrial applications such as welding and chemical and pharmaceutical processing. The dust collectors 10 are divided into a clean 12 and dirty-air chamber 14. Filters 16 used to clean the dirty air are enclosed within the dirty-air chamber 14.

The invention, as shown in FIGS. 1, 2, 3, 4 and 5 involves an air-channeling apparatus 18 that is designed to channel the flow of air into the dirty-air chamber 14 of a dust collector 10 having an air entrance port 20, a ceiling 22, a bottom portion 24, and side walls 26 including one with the air entrance port 20. The air-channeling apparatus 18 is comprised of a top baffle member 28 that is secured with respect to the ceiling 22. The top baffle member 28 is positioned at the entrance port 20 and converges inwardly toward the ceiling 22 in order to define a first opening 30 therebetween. A first angled baffle member 32 connects to and angles away from the top baffle member 28.

In another embodiment of the invention, a rear baffle member 34 having a plurality of openings 36 is attached to the ceiling 22 inward of the first opening 30. In still another embodiment, a vertical baffle member 38 in registry with a portion of the air entrance port 20 and spaced from the ceiling 22 is also secured with respect to the ceiling 22 thereby defining a second opening 40 with respect to the side wall 26 having the air entrance port 20.

In a preferred embodiment of the invention, a second angled baffle member 42 is also spaced from and secured with respect to the ceiling 22. This second angled baffle member 42 is spaced immediately inboard of the vertical baffle member 38 thereby defining a third opening 44 between the vertical baffle member 38 and the second angled member 42 and a fourth opening 46 with respect to the first angled baffle member 32. In a specific version of the preferred embodiment, the rear baffle member 34 is curved. In a more specific version, the rear baffle member 34 is curved approximately 150° from the air entrance port 20.

In yet another version of the preferred embodiment, the vertical baffle member 38 extends in a direction substantially parallel to a first plane which is defined by the air entrance port 20 and is substantially perpendicular to the flow of air 48. The second angled baffle member 42 has a first edge 50 that extends along a second plane which is parallel to the first plane. In this embodiment, the vertical baffle member 38 is connected to the second angled baffle member 42 by a plurality of first separators 52 which are positioned along the length of the vertical baffle member 38, and the second angled baffle member 42 is connected to the first angled baffle member 32 by a plurality of second separators 54 that are positioned along the length of the second angled baffle member 42 thereby forming various channels to accommodate the flow of air.

Figure 2:
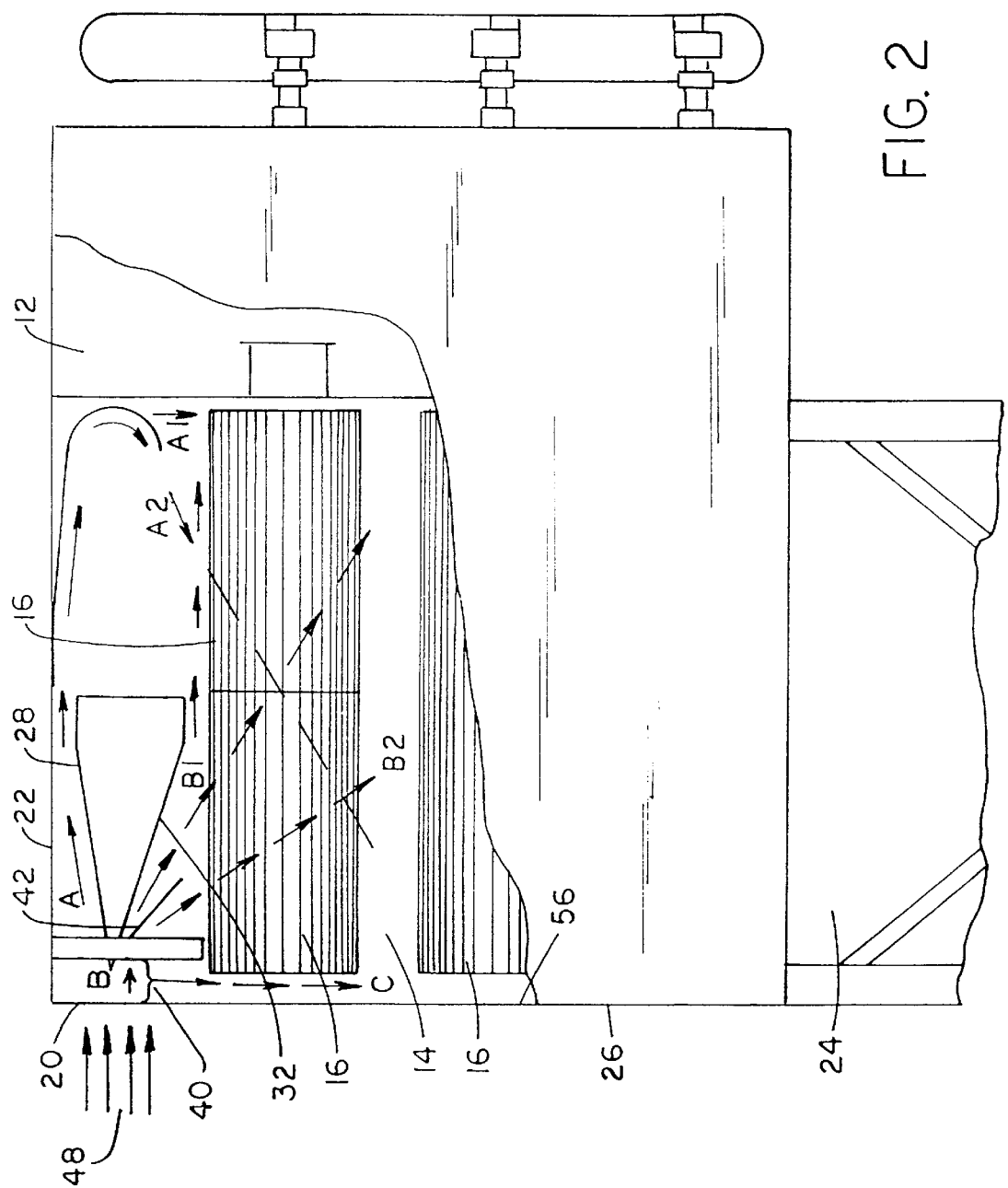
FIG. 2 is a side view of a dust collector with a cut-away portion showing the flow of air through the air-channeling apparatus and around the filter cartridges in the dirty-air chamber of a dust collector.
Figure 3:
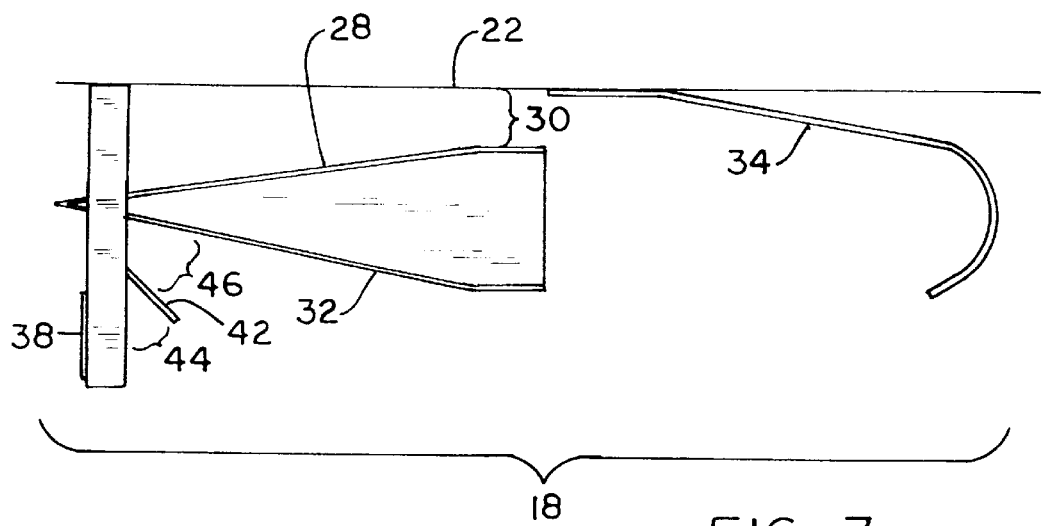
FIG. 3 is a side view of the air-channeling apparatus.
Figure 4:
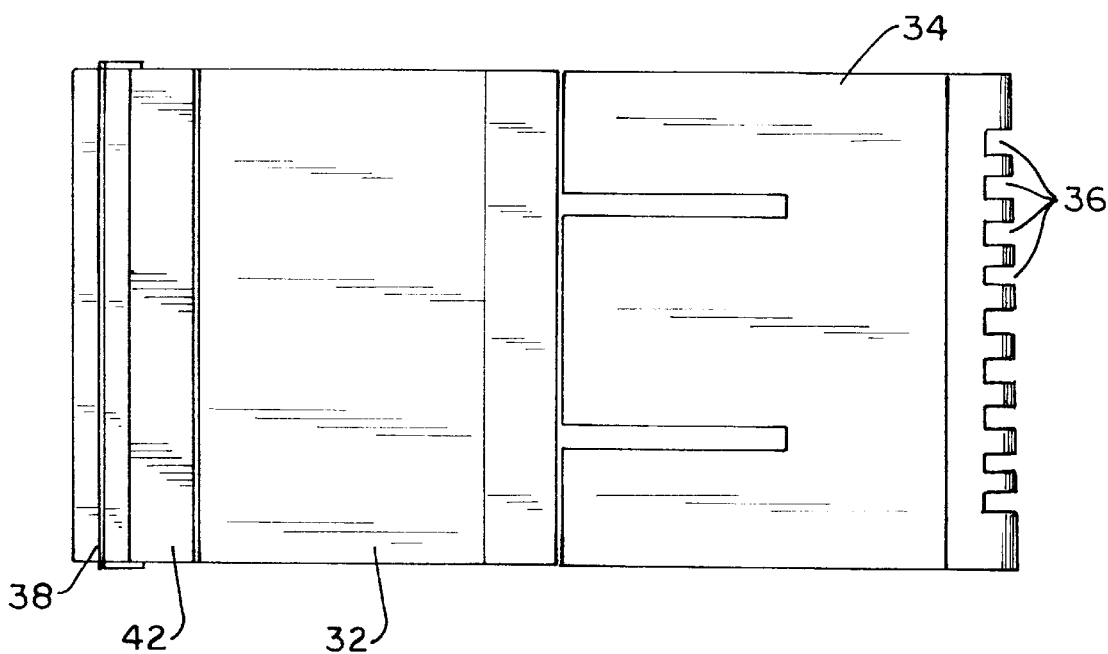
FIG. 4 is a bottom view of the air-channeling apparatus.
Figure 5:
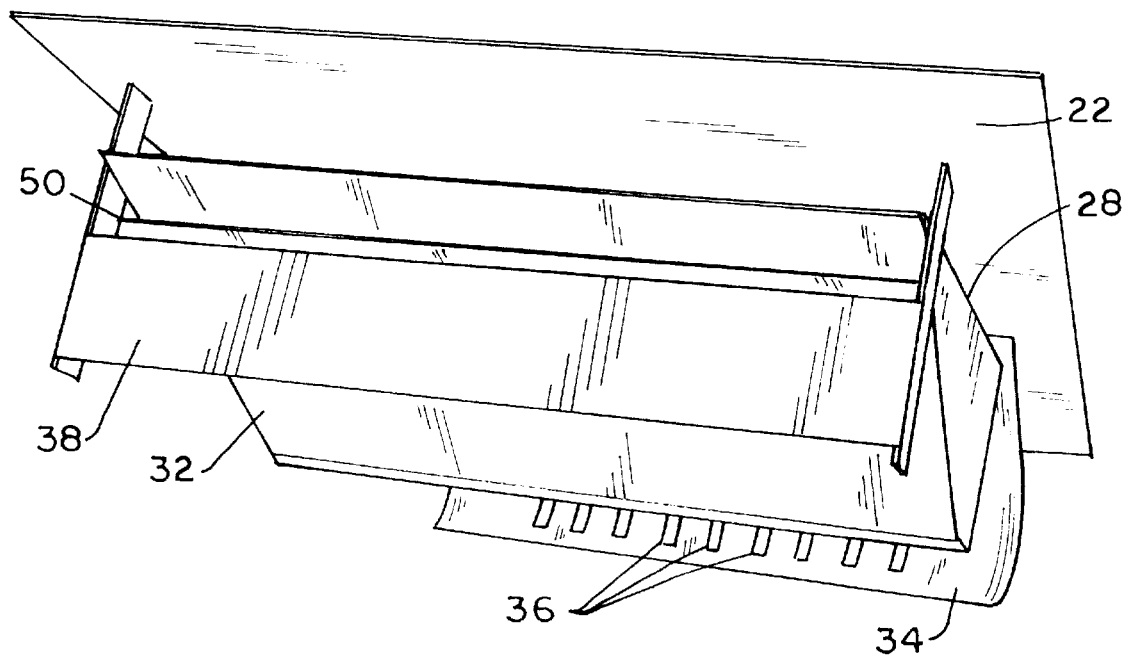
FIG. 5 is a perspective view showing the underside of an air-channeling apparatus that is attached to the ceiling of a dust collector.

FIGS. 1, 2 and 3 show the most preferred embodiment of the invention featuring a top baffle member 28 that is secured with respect to the ceiling 22 of the air chamber 14. Such top baffle member 28 is positioned at the entrance port 20 of the chamber 14 and converges inwardly toward the ceiling 22 where it defines a first opening 30 between itself and the ceiling 22. A first angled baffle member 32 is connected to and angled away from the top baffle member 28. Also in this embodiment, a rear baffle member 34 having a plurality of openings 36 is attached to the ceiling 22 inward of the first opening 30 while a vertical baffle member 38, in registry with a portion of the air entrance port 20, is spaced from and secured with respect to the ceiling 22. This vertical baffle member 38 defines a second opening 40 with respect to the side wall 26 having the air entrance port 20. Finally, a second angled baffle member 42 is located immediately inboard of the vertical baffle member 38 thereby defining a third opening 44 between the vertical baffle member 38 and the second angled member 42 and a fourth opening 46 with respect to the first angled member 32.

In a specific version of the preferred embodiment, as shown in FIGS. 1, 2, the rear baffle member 34 is curved. In a more particular version of this embodiment, the rear baffle member 34 is curved approximately 150° from the air entrance port 20 of the dirty-air chamber 14.

FIG. 1 shows still another embodiment of the invention wherein the vertical baffle member 38 extends in a direction substantially parallel to a first plane that is defined by the air entrance port 20 and is substantially perpendicular to the flow of incoming air 48. In such embodiment, the second angled baffle member 42 has a first edge 50 which extends along a second plane which is parallel to the first plane. A plurality of first separators 52 are positioned along the length of the vertical baffle member 38 so as to connect the vertical baffle member 38 to the second angled baffle member 42 and a plurality of second separators 54 positioned along the length of the second angled baffle member 42 connect the second angled baffle member 42 to the first angled baffle member 32 thereby forming various channels to accommodate the flow of air.

Because the invention, in its most preferred embodiment, causes the air entering the dirty-air chamber 14 to be channeled through four separate openings 30, 40, 44, 46, the air flow is forced into four predetermined directions thus creating a balanced flow of air across the filters 16. The predetermined flow channels reduce the unproductive dirty air flow patterns that occur in conventional dirty-air chambers thereby increasing the efficiency of the filters 16.

As shown in FIG. 2, when the dirty-air stream 48 travels through the air entrance port 20 and enters the dirty-air chamber 14, the air channeling apparatus 18 in the most preferred embodiment of the invention divides the dirty-air stream into secondary air streams A, B, and C. The A air stream is directed upwards at a slightly inclined angle until the stream is adjacent to the ceiling 22 of the dirty-air chamber 14. Because the inclined slope of the top baffle member 28 reduces the height of the first opening 30 formed between the top baffle member 28 and the ceiling 22 of the dirty-air chamber 14, the velocity of air in the first opening 30 increases along with the density of the dirty air.

As air stream A travels along the ceiling 22 of the dirty-air chamber 14, it eventually reaches the rear baffle member 34 that is attached to the ceiling 22 inward of the first opening 30. The rear baffle member 34 initially redirects air stream A vertically downward. Once traveling in the downward direction, air stream A encounters a plurality of openings 36 that are positioned on the rear baffle member 34. These openings 36 siphon off a portion of air stream A into a new air stream A1.

Air stream A1 continues downward from the openings 36 on the rear baffle member 34 until it reaches the portion of the filter media 16 located near the back of the dirty-air chamber 14. There, a major portion of air stream A1 settles on the surface of the top filter media 16. The remaining portion of air stream A1 travels further downward toward the bottom of the dirty-air chamber 14 where its velocity decreases and the pressure from the collector fan (not shown) moves the dirty-air stream against the subsequent rows of filter media 16 located beneath the top row. Once in contact with the filter media 16, the dirty-air moves through the filter media thereby becoming filtered air. The dust in the dirty-air chamber 14 remains on the outside of the filter media of the cartridges 16 until the cleaning cycle is initiated.

The downward flow of air stream A1 assists the overall downward flow of the dirty air which is beneficial for collecting dust since the dirty air stream A1 is directed in close proximity to the filters 16.

In a specific version of the most preferred embodiment, as shown in FIGS. 1, 2, 3, 4, and 5, the rear baffle member 34 is curved. In such embodiment, the rear baffle member 34 continues to turn the flow direction of the remaining portion of air stream A i.e., air stream A2, until it is rotated approximately 150° from the direction of flow of air stream A entering the chamber 14. This reversal causes air stream A2 to flow both downward and backward toward the front of the dirty-air chamber 14. In such flow pattern, a portion of air stream A2 contacts the section of the top row of filters 16 located in the middle of the dirty-air chamber 14. Because the remaining portion of air stream A2 flows around the top row of filters 16, it prevents a build-up of dust on the upper surface of the top row of cartridges 16.

As the remaining portion of air stream A2 continues to travel in a downward diagonal direction as shown in FIG. 2, it enhances the flow of dust onto the lower level of filters 16. Furthermore, air stream A2 collides with other downward flowing air streams thereby reducing their fast moving flow rates.

As shown in FIG. 2, in that portion of the dirty-air chamber 14 where the incoming stream of dirty air is divided into separate air streams A, B, and C, dirty-air stream B is directed downward approximately 15° due to the downward slope of the first angled baffle member 32. Shortly after separating into air streams A and B, air stream B is separated into streams B1 and B2. Air stream B1 is channeled into the fourth opening 46 between the first 32 and second 42 angled members. The remaining portion of the B air stream i.e., B2 is directed approximately an additional 15° downward through the third opening 44 which is located between the vertical baffle member 38 and the second angled baffle member 42.

Air streams B1 and B2 accomplishes a multitude of benefits including: (1) suppling an ample flow of angled downward air to the front portion of the top filters 16 thus tending to remove excess dust from the top sides of the upper row of cartridges; (2) colliding with air stream A2 which reduces the strong swirling air flow currents inside the dirty air chamber 14 thereby enhancing the dropping of dust into the hopper 24; (3) maintaining a general downward air flow inside the dirty air chamber 14 thus helping to prevent updrafts of dust particles during the cleaning cycle of the cartridges 16; (4) preventing an upward flow of reflected air from inside the dirty-air chamber 14.

Once the full flow of the dirty-air stream enters through the air entrance port 20 it immediately encounters the vertical baffle member 38. Such baffle member 38 momentarily stops a large portion of the incoming dirty-air and redirects it vertically downward through the fourth opening 46 which is formed between the baffle member 38 and the side wall 26 of the dirty-air chamber 14. This vertically downward directed flow of air is identified as air stream C in FIG. 2. Such air stream provides multiple benefits including: (1) slowing the rate of incoming dirty air thereby allowing the filter cartridges 16 to pull the air towards their filter media; (2) stopping a reflective upward swirl motion along the inside door wall 56 thus promoting stillness in the hopper 24 area; and (3) contributing downward air flow to the very front of the cartridges 16 thereby helping to distribute the dirty air equally across the surface of the cartridges 16.

This balanced distribution of dirty air across the length of the filter cartridges 16 results in a more efficient use of the filters 16 as the dirty air tends to spread itself evenly across not only the length of the filters 16, but also all rows of filters 16 contained in the dirty-air chamber 14.

While the principles of the invention have been shown and described in connection with but a few embodiments, it is understood clearly that such embodiments are by way of example and are not limiting.

What is claimed:

1. Air-channeling apparatus for channeling a flow of air into a dirty-air chamber of a dust collector, the dust collector having an air entrance port, a ceiling, a bottom portion, a filter located in the dirty-air chamber and a plurality of side walls including one having the air entrance port, the air-channeling apparatus comprising:

a top baffle member secured with respect to the ceiling, the top baffle member positioned at the entrance port and inwardly converging toward the ceiling to define a first opening therebetween; and a first angled baffle member connected to and angling away from the top baffle member.

2. The air-channeling apparatus of claim 1 wherein a rear baffle member is attached to the ceiling inward of the first opening, the rear baffle member having a plurality of openings.

3. The air-channeling apparatus of claim 2 wherein a vertical baffle member is in registry with a portion of the air entrance port and spaced from the ceiling, the vertical baffle member secured with respect to the ceiling and defining a second opening with respect to the side wall having the air entrance port.

4. The air-channeling apparatus of claim 3 wherein a second angled baffle member is spaced from and secured with respect to the ceiling, the second angled baffle member spaced immediately inboard of the vertical baffle member thereby defining a third opening between the vertical baffle member and a fourth opening with respect to the first angled baffle member.

5. The device of claim 2 wherein the rear baffle member is curved.

6. The device of claim 5 wherein the rear baffle member is curved approximately 150° from the air entrance port.

7. The device of claim 4 wherein:

the vertical baffle member extends in a direction substantially parallel to a first plane defined by the air entrance port and substantially perpendicular to the flow of air;

the second angled baffle member having a first edge, said edge extending along a second plane parallel to the first plane;

the vertical baffle member is connected to the second angled baffle member by a plurality of first separators positioned along the length of the vertical baffle member; and the second angled baffle member is connected to the first angled baffle member by a plurality of second separators positioned along the length of the second angled baffle member thereby forming various channels to accommodate the flow of air.

8. Air-channeling apparatus for channeling a flow of air into a dirty-air chamber of a dust collector, the dust collector having an air entrance port, a ceiling, a bottom portion, a filter located in the dirty-air chamber, and a plurality of side walls including one having the air entrance port, the air-channeling apparatus comprising:

a top baffle member secured with respect to the ceiling, the top baffle member positioned at the entrance port and inwardly converging toward the ceiling to define a first opening therebetween;

a first angled baffle member connected to and angling away from the top baffle member;

a rear baffle member attached to the ceiling inward of the first opening, the rear baffle member having a plurality of openings;

a vertical baffle member in registry with a portion of the air entrance port and spaced from the ceiling, the vertical baffle member secured with respect to the ceiling and defining a second opening with respect to the side wall having the air entrance port; and a second angled baffle member spaced from and secured with respect to the ceiling, the second angled baffle member spaced immediately inboard of the vertical baffle member between the vertical baffle member and the first angled member thereby defining a third opening between the vertical baffle member and the second angled member and a fourth opening with respect to the first angled baffle member.

9. The device of claim 8 wherein the rear baffle member is curved.

10. The device of claim 9 wherein the rear baffle member is curved approximately 150° from the air entrance port.

11. The device of claim 8 wherein:

the vertical baffle member extends in a direction substantially parallel to a first plane defined by the air entrance port and is substantially perpendicular to the flow of air;

the second angled baffle member having a first edge, said first edge extending along a second plane parallel to the first plane;

the vertical baffle member is connected to the second angled baffle member by a plurality of first separators positioned along the length of the vertical baffle member; and the second angled baffle member is connected to the first angled baffle member by a plurality of second separators positioned along the length of the second angled baffle member thereby forming various channels to accommodate the flow of air.

* * * * *